United States Patent
Thompson

[15] 3,647,309
[45] Mar. 7, 1972

[54] APPARATUS FOR CONTROLLING AN INJECTION MOLDING MACHINE

[72] Inventor: Robert H. Thompson, Brunswick, Ohio
[73] Assignee: Van Dorn Company, Cleveland, Ohio
[22] Filed: Sept. 19, 1969
[21] Appl. No.: 859,525

[52] U.S. Cl. ............................. 425/139, 425/145, 425/150, 425/162, 425/165
[51] Int. Cl. ......................................................... B29f 1/00
[58] Field of Search ............... 18/30 CK, 30 CM, 16 C, 17 C, 18/2 HI, 2 RP, 30 SS, 30 SR, 30 CR, 1 CK, 1 CM, 2 HA, 30 CR, 30 CV; 307/235, 247; 328/146, 147

[56] References Cited

UNITED STATES PATENTS

| | | | |
|---|---|---|---|
| 2,739,349 | 3/1956 | Strauss | 18/2 RP X |
| 3,044,389 | 7/1962 | Rexford | 18/16 X |
| 3,369,130 | 2/1968 | Stern | 307/247 |
| 3,539,830 | 11/1970 | Zollinger | 307/235 |

FOREIGN PATENTS OR APPLICATIONS 1,110,534  4/1968  Great Britain ........................ 18/30 CR Primary Examiner—J. Spencer Overholser
Assistant Examiner—Norman E. Lehrer
Attorney—Meyer, Tilberry and Body

[57] ABSTRACT

Injection molding apparatus is provided with readily preset means for automatically or semiautomatically causing certain functions to be performed in relation to the movement of reciprocating members including a platen, injection screw and eject mechanism. To this end sensing potentiometers are provided which produce voltages representing positions of the moving members and reference potentiometers are provided which are set to provide voltages representing various positions of the various movable members at which desired functions are to be performed. Voltage comparator-bistable circuits are provided for each function to be performed. They are so connected that when the sensing voltage agrees with the reference voltage actuation of the member of the molding apparatus or a decision function takes place. A dial is provided for each of the reference potentiometers to enable the operation desired to be preset.

3 Claims, 7 Drawing Figures

3,647,309

APPARATUS FOR CONTROLLING AN INJECTION MOLDING MACHINE

PRELIMINARY DESCRIPTION

In carrying out the invention in accordance with a preferred form thereof the invention is applied in an otherwise conventional injection molding machine having a mold platen for opening and closing the mold by hydraulic pressure, a motor-driven injection screw for injecting the plastic shot into the mold, an hydraulically operated ejector and for certain types of operation a carriage for moving the injector with its nozzle into engagement with the mold orifice or backing it off. Sensing potentiometers are provided having sliding contacts mechanically connected to the respective moving parts for producing sensing voltages varying linearly with the movement of the moving part. A control board is provided containing reference potentiometers and printed circuit logic cards or modules including comparator circuits connected to compare reference voltages with sensing voltages and actuating solenoids or other controls for initiating and terminating various functions of the molding machine.

DRAWINGS

A better understanding of the invention will be afforded by the following detailed description considered in conjunction with the accompanying drawings in which FIG. 1 is a schematic diagram of an injection molding machine in which the invention may be applied.

Like reference characters are utilized throughout the drawing to designate like parts.

Figure 1:
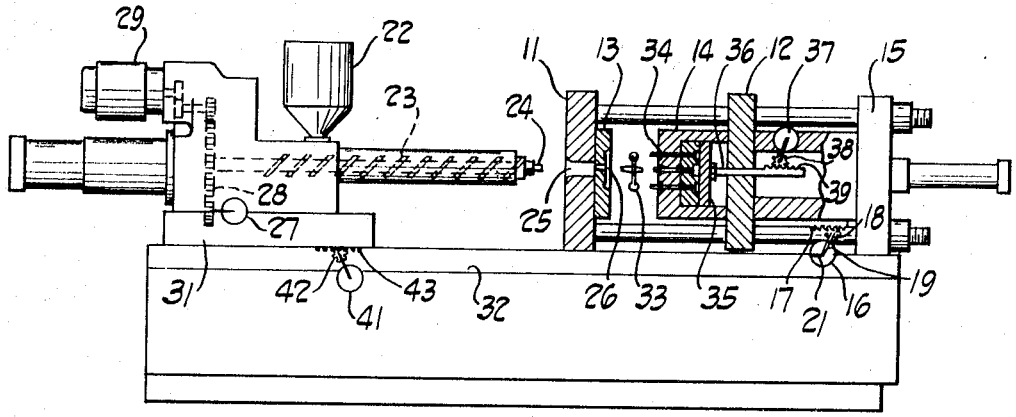

FIG. 1 illustrates schematically the manner of applying the invention in an injection molding machine which may be employed for injection molding of either thermoplastic resins or thermosetting resins. The machine itself other than the controls in accordance with the invention is of conventional type comprising a mold clamp, a screw or plunger, with a carriage, and ejector mechanism. The clamp comprises a stationary platen 11 and a movable platen 12 to which mold parts 13 and 14 are secured in a conventional manner (not shown). The movable platen 12 may be actuated in any suitable manner as by means of a hydraulic cylinder (not shown) acting upon a piston 15. For indicating the position of the clamp piston 15 and the platen 12 a potentiometer 16 is provided having a movable element mechanically connected in a suitable manner to some moving part of the platen 12 or piston 15, for example, by means of a rack 17 secured to the movable member 15, a pinion 18 engaging the rack 17 and a shaft 19 carrying the pinion 18 connected to a schematically represented movable element 21 in the potentiometer 16.

For injecting the molding material from a receptacle 22, a conventional screw device 23 is illustrated, having a nozzle 24 adapted to engage a sprue hole 25 in the stationary platen 11 to which the mold part 13 is secured, which likewise has a sprue hole 26. For indicating the movement of the screw 23, another potentiometer 27 is provided, connected by suitable linkage, represented schematically as a gear and pinion linkage 28 to the shaft of the screw 23 or to the motor 29 for driving the screw 23. The screw 23 and driving motor 29 and other supporting parts are mounted upon a carriage 31 adapted to travel on a track 32. For clarity in the drawing, the carriage 31 is shown in a position with the screw nozzle 24 backed away from the platen 11 although it will be understood that in molding thermoplastic compounds the carriage would be left in the position with the nozzle 24 engaging the sprue hole 26 of the mold part 13.

Suitable means are provided for ejecting a molded part 33 after the mold halves have parted. This may take the form of conventional ejector pins 34 carried by an injector plate 35 secured to an ejector bar 36. A potentiometer 37 is provided for sensing the position of the ejector mechanism. The potentiometer 37 is mechanically connected in a suitable manner to the ejector mechanism. The connection is represented schematically by a pinion 38 and a rack 39 secured to the ejector bar 36.

When thermosetting resins are to be molded, a potentiometer 41 is also provided for sensing the position of the carriage 31. The carriage sensing potentiometer 41 is made responsive to the position of the carriage 31 in a suitable manner represented schematically by pinion 42 and a rack 43, secured to the carriage 31.

The ejector mechanism may be actuated in any suitable conventional manner as by means of adjustable stops, or hydraulically by means not shown.

Figure 2:
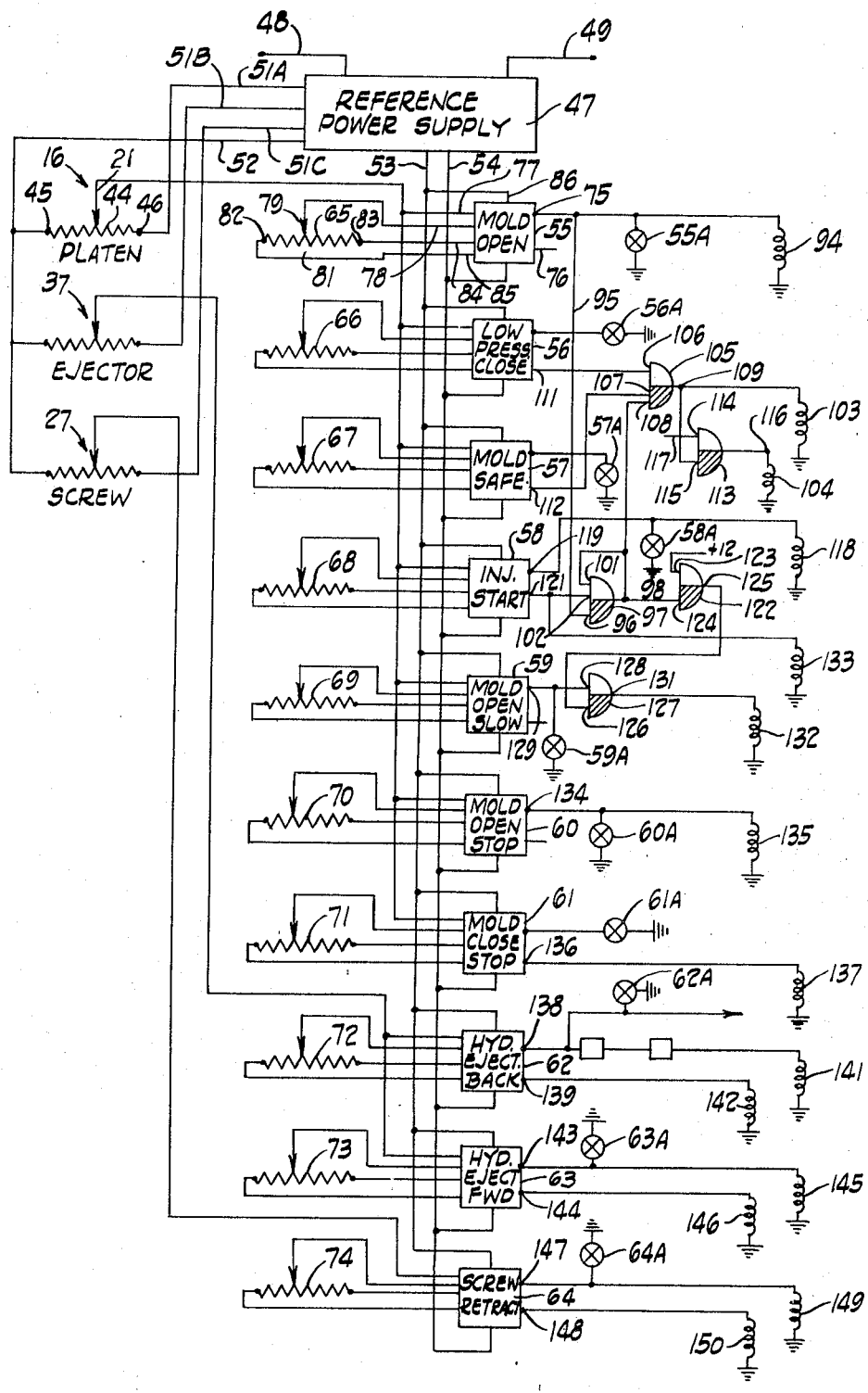
FIG. 2 is a circuit diagram of a control system for the molding machine for an illustrative embodiment of the invention.

FIG. 2 illustrates a circuit which may be employed in connection with the injection of thermoplastic materials so that a carriage position sensing potentiometer is not required during such operation. Ordinarily, a potentiometer is required for decision functions related to carriage position when thermosetting material is being molded. However, all the potentiometers operate in the same manner. Each consists of a resistor having terminals adapted to be connected to a source of current. In the arrangement described, direct current is employed.

The platen potentiometer 16 comprises a resistor 44 having terminals 45 and 46 and a movable element including a sliding contact 21 which electrically contacts the portion of the resistor 44 corresponding to the position of the platen so as to provide a sensing voltage varying with the platen position. The ejector potentiometer 37 and the screw potentiometer 27 are similarly constructed.

For supplying voltage to the potentiometers a reference power supply 47 is provided having power input terminals 48 and 49 and a plurality of output terminals. The output terminals include a separate positive terminal for each of the sensing potentiometers, in this case output terminals 51A, 51B, and 51C for potentiometers 16, 37, and 27 respectively and a negative output terminal 52 which is common to the potentiometers 16, 27 and 37. A positive output terminal 53 and a negative output terminal 54 are also provided for each of the plurality of control circuits as will be explained more fully hereinafter.

In order that decision functions for automatic or semiautomatic operation may be produced, a plurality of reference potentiometers and control circuit units is also provided. The number and the connections of such units depend upon the desired mode of operation and the decision functions to be carried out. For example, as illustrated in FIG. 2, there is a plurality of control circuit units including a mold open unit 55, a low pressure close unit 56, mold safe unit 57, an injection start unit 58, a mold open slow unit 59, a mold open stop unit 60, a mold close stop unit 61, an hydraulic ejector back unit 62, an hydraulic ejector forward unit 63, and a screw retracted unit 64. For each of these units there is a corresponding reference potentiometer, viz, the potentiometers 65, 66, 67, 68, 69, 70, 71, 72, 73 and 74 respectively.

The control circuit units 55 to 64 do not in themselves constitute a part of the present invention; preferably they are the printed card or module type supplied by printed circuit manufacturers which may be readily inserted or removed for adapting the apparatus for modifications in method of operation. Each such printed circuit card consists of a suitable conventional circuit including a conventional bistable circuit, which will produce a positive output voltage in a fixed amount, for example, 12 volts at one output terminal and zero output at a second output terminal when one of the input voltages equals or exceeds the other. For example, the circuit unit 55 has a zero output terminal 75 and a one output terminal 76. There is a sensing voltage, input terminal 77 from the sliding contact 21 of the platen potentiometer 16 and a reference voltage input terminal 78 from the sliding contact 79 of the reference potentiometer 65. The potentiometer 65 comprises a resistor 81 having end terminals 82 and 83 adapted to be connected to a source of voltage. In the particular arrangement shown the circuit card 55 is arranged to provide the voltage for the potentiometer terminals 82, 83 at voltage supply terminals 84 and 85. The unit 55 has an input terminal 86 connected to the positive output terminal 53 of the reference power supply 47 and an input terminal 87 connected to the negative output terminal 54 of the reference power supply 47.

Figure 6:
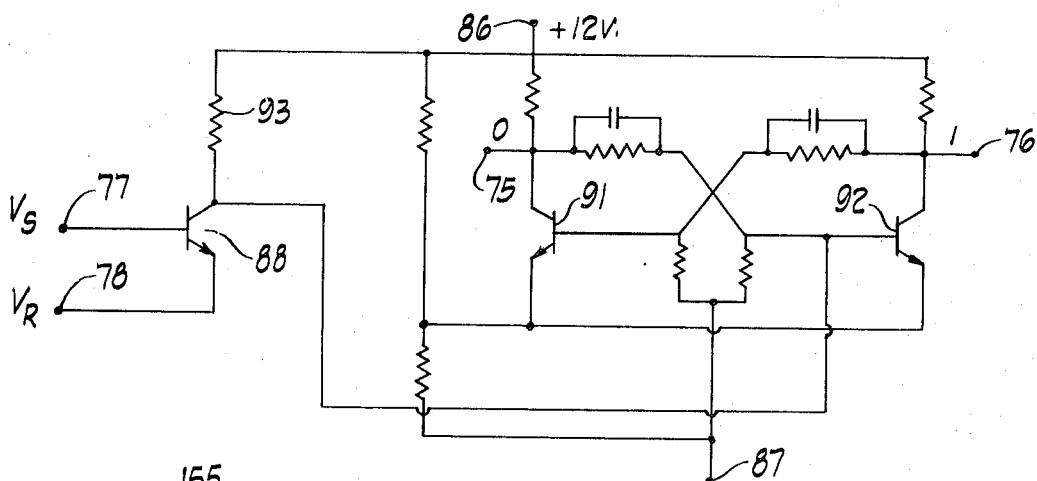
FIG. 6 is an illustrative module or card circuit which may be used in conjunction with one of the reference potentiometers for effecting control of the machine.

Any suitable internal circuits may be employed for the circuit units 55 to 64 so long as they produce output voltages which reverse when the sensing voltage is not equal to or greater than the reference voltage. For example, as illustrated in FIG. 6 such a circuit may consist of a voltage comparator transistor stage 88 and a pair of transistors 91 and 92 each comprising a collector, an emitter and a base, as shown, connected in a conventional bistable or flip-flop circuit, with the bases and collectors cross-coupled by resistors shunted by capacitors and with one of the bases connected to the load terminal of the voltage comparator transistor 88. As shown, the base of the transistor 92 is connected to the load terminal or collector of the transistor 88. Since the invention has been described as using positive voltages, NPN-transistors are illustrated. As shown, the sensing voltage terminal 77 is connected to the base of the transistor 88, a reference voltage terminal 78 is connected to the emitter of the transistor 88 and the collector serves as a load terminal connected in series with a resistor 93 to the positive input power supply terminal 86. Collectors of the transistors 91 and 92 are connected to the output terminals 75 and 76 respectively of the circuit unit 55.

Similar circuit units 56, 57, 58, 59, 60 and 61 are provided for producing certain decision functions at different positions of the platen. The corresponding potentiometers 66 to 71, inclusive, have their sliding contacts set at voltage points corresponding to positions of the platen in which the functions in question are to be performed.

The circuit units 62 and 63 are provided for causing certain functions to be performed at the back and forward positions of the ejector. To this end, the potentiometers 72 and 73 are adjusted so that the voltages of the potentiometers and the positions of the sliders correspond to the sliding contact position of the ejector potentiometer 37 at the back and forward positions respectively. In a similar manner, the potentiometer 74 is connected to the screw retracted unit, 64 has its sliding contact adjusted to correspond to the voltage on the sliding contact of the screw potentiometer 27 when the screw is fully retracted.

The control circuit modules 55, 56, 57, 58, 59, 60, 61, 62, 63 and 64 have their output terminals connected to suitable operators, usually solenoids, for effecting the desired operating sequence, or protective devices. In some cases, gates are interposed which consist of conventional logic circuits of the solid-state type. The zero output terminal 75 of the mold open control circuit 55 is connected, for example in one illustrative type of operation, to a solenoid 94 for actuating the eject mechanism. The terminal 75 is also connected through a line 95 to an inhibit input terminal 96 of a gate 97 of the inhibit-OR type, which has an output terminal 98. The inhibit-OR-gate 97 and others referred to hereinafter in this specification are not a part of the present invention but are the type available on the market manufactured by suppliers of logic circuits.

The gate 97 also has OR-input terminals 101 and 102.

There is a solenoid 103 for admitting low pressure to the platen-actuating cylinder in the mold closing direction for moving the mold at low speed as it approaches the closed position and a solenoid 104 for admitting higher pressure after the mold has reached the mold safe position.

For controlling the low pressure close solenoid 103, there is a gate 105 of the OR-inhibit type having an OR input terminal 106 and two inhibit input terminals 107 and 108 with an output terminal 109. The output terminal 109 is connected to the low pressure close solenoid 103, the input terminal 106 is connected to the one output terminal 111 of the low pressure close control circuit 56. The inhibit input terminal 107 is connected to the one output terminal 112 of the mold safe control circuit 57. The inhibit input terminal 108 is connected to the output terminal 98 of the gate 97. There is an OR inhibit gate 113 with an OR input terminal 114, an inhibit input terminal 115, and an output terminal 116. The input terminal 114 is connected to a positive voltage terminal 117. The inhibit input terminal 115 is connected to the output terminal 109 of the gate 105 and the output terminal 116 is connected to the mold safe solenoid 104.

There is a not, mold-closed solenoid 118 connected to the zero output terminal 119 of the inject start control circuit 58 for locking out operation of the inject screw. The OR-input terminal 101 of the gate 97 is connected to the output terminal 98 for serving as a holding circuit. The OR-input terminal 102 at the gate 97 is connected to the one output terminal 121 of the inject start control circuit 58.

There is also an OR-inhibit gate 122 having an OR-input terminal 123 connected to a positive voltage supply terminal, an inhibit input gate 124 connected to the output terminal 98 of the gate 97, and an output terminal 125 connected to an inhibit terminal 126 of a gate 127. The gate 127 has an OR-input terminal 128 connected to the zero output terminal 129 of the mold open slow control circuit 59 and an output terminal 131 connected to solenoid 132 for admitting pressure to the platen operator for opening the mold slowly. The one output terminal 121 of the injection start control circuit 58 is also connected to an injection start solenoid 133 for energizing the screw motor in the forward direction.

The mold open stop control circuit 60 has a zero output terminal 134 connected to a solenoid 135 for locking out the pressure from the platen in the mold opening direction and the mold closed stop control circuit 61 has a one output terminal 136 for energizing a solenoid 137 for cutting off the pressure on the platen operating cylinder in the mold closing direction.

The hydraulic ejector back control circuit 62 has a zero output terminal 138 and a one output terminal 139 connected to solenoids 141 and 142 respectively, the former for effecting mold closing and the latter for locking out movement of the platen in the mold closing direction.

The hydraulic ejector forward control circuit 63 has a zero output terminal 143 and a one output terminal 144 connected to solenoids 145 and 146, respectively, for locking out platen motion in the mold closing and mold opening directions, respectively.

The screw retracted control circuit 64 has a zero output terminal 147 and a one output terminal 148 connected to solenoids 149 and 150 respectively, the former for stopping the motion of the screw motor and the latter for locking out motion of the clamp or the platen in mold opening direction.

As indicated above, the inhibit gates are connected to prevent the operation of various functions of the injection molding machine in advance of the proper time in the sequence of the operating cycle. The OR-inhibit gates described are not a part of the present invention but may be of any suitable type.

The principle of operation of such OR-inhibit gates described in various texts, for example at page 164 referring to FIG. 8.22 and at page 26 referring to FIG. 2.16 of Digital Computer Principles by Burrough Corporation published by McGraw Hill Company Inc. (1962).

Figure 7:
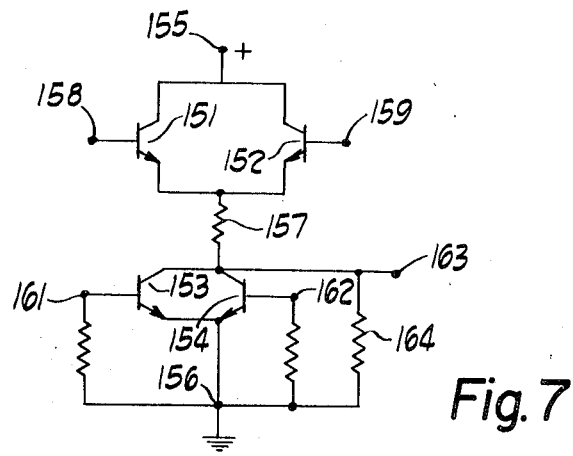
FIG. 7 is an illustrative gate circuit.

An illustrative form of OR-inhibit gate logic circuit is shown in FIG. 7 utilizing NPN-transistors. Transistors 151, 152, 153 and 154 are connected in series parallel between a positive power supply terminal 155 and a negative terminal 156 with an interposed load resistor 157 acting as a collector resistor for the transistors 153 and 154. OR input terminals 158 and 159 are connected to the bases of the transistors 151 and 152 respectively, and inhibit input terminals 161 and 162 are connected to the bases of the transistors 153 and 154 respectively. The collector connection of the transistors 153 and 154 serves as the output terminal 163, which is preferable biased to ground by a bias-resistor 164.

If a positive pulse is applied to either of the OR-input terminals 158 and 159 when there is no voltage on either terminal 161 or 162, the voltage at the output terminal 163 rises to that at the positive power supply terminal 155. Otherwise, it is depressed by the bias resistor 164. On the other hand, if a positive pulse is applied to either of the inhibit input terminals 161 and 162, current is drawn through the load resistor 157 to depress the voltage at the output terminal 163.

Figure 3:
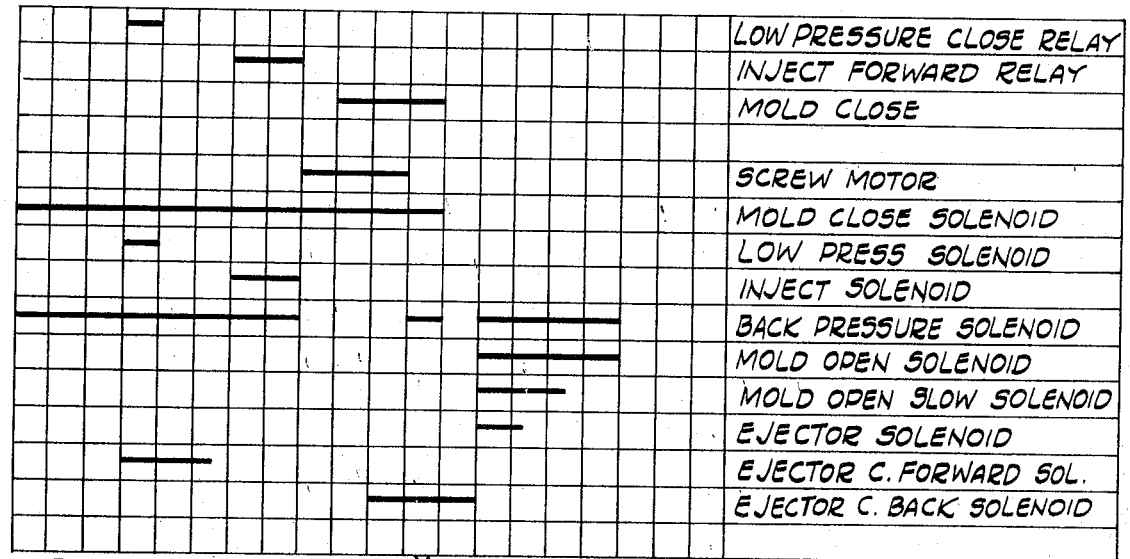
FIG. 3 is a chart showing an illustrative sequence of operations or functions which may be present and produced by the control system.

The order in which the solenoids are actuated is illustrated in the sequence chart of FIG. 3 for a semiautomatic operation in which the operation is commenced by manually closing the front gate to the chamber enclosing the platens for the mold parts. For safety purposes, as in conventional apparatus, interlocks are provided on the front gate to prevent the mold closing solenoid and the back pressure solenoid from being energized until the front gate is closed. Thereupon the cycle starts. When the platen has moved to the position designated as low pressure close, the low-pressure solenoid and the injector cylinder forward solenoids are energized, and when the platen has reached the mold safe position the same solenoids remain energized. As the clamp reaches the fully closed position the injector cylinder forward solenoid drops out. The clamp having reached the injector start position, the injector solenoid is energized and remains energized as the injector cylinder reaches the full forward position. At the end of the time cycle for which the injector screw relay is timed the screw motor starts to retract, and when the screw is fully retracted the mold closing relay is energized.

The front gate may then be opened manually which permits the mold open slow and ejector solenoids to be energized. When the hydraulic ejector has reached its full forward position, the ejector solenoid is deenergized and the back pressure mold open and mold open slow solenoids remain energized while the hydraulic ejector returns to its full back position. When it has reached the full back position, the mold open slow solenoid deenergizes and the mold open and back pressure solenoids remain energized the mold is fully opened whereupon the cycle ends.

When it is desired to utilize the injector molding machine for molding thermosetting materials, the injector carriage is caused to move forward and back at appropriate times. As indicated in FIG. 3, the injector carriage forward actuation commences immediately after the screw starts to retract and injector carriage reverse movement begins after the screw has been fully retracted. To accomplish this, additional control circuits such as illustrated in FIG. 2 may be employed with corresponding suitable solenoids and actuators employing the same principle of operation as previously described in connection with the elements shown in FIG. 2.

The use of the control circuit cards or modules such as the units 55 to 64, inclusive, obviates the need for the use of limit switches to accomplish the functions of these circuits and also facilitates changing the setup of the machine for different types of operation. For example, if the operation is to be changed from molding thermosetting material to that of molding thermoplastic material, additional control cards for actuation of the injector carriage are simply removed from the control board and the operation takes place as described as for molding thermoplastic material. Moreover, the use of the control circuit cards in place of limit switches not only facilitates the setup of the apparatus for a changed type of plastic or mode of operation but also facilitates precise setting of the positions of the platen and other parts at which the various functions are to take place.

Figure 5:
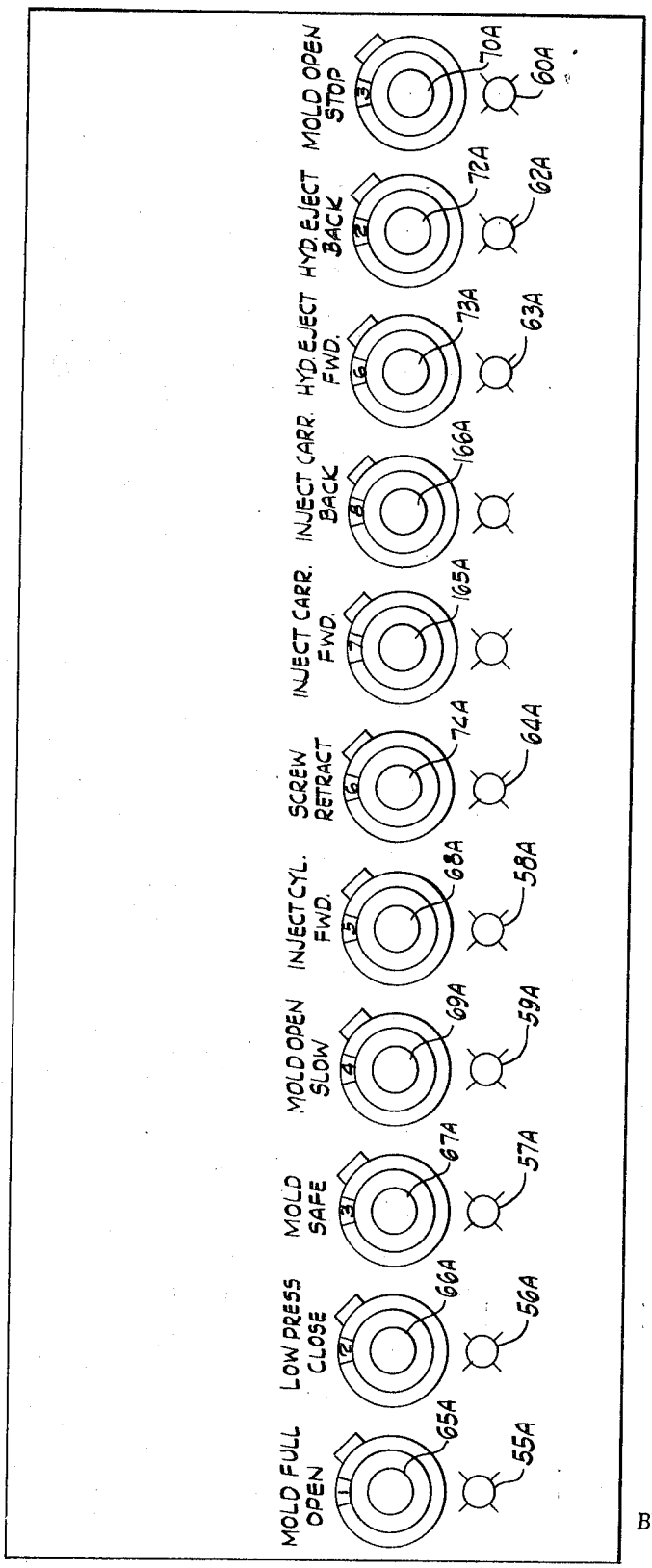
FIG. 5 is a diagram illustrating the use of dials for presetting the desired machine operation.

As illustrated in the FIG. 5, each of the reference potentiometers is provided with a dial. The reference potentiometers 65, 66, 67, 68, 69, 70, 72, 73 and 74 shown in FIG. 2 have their sliding contacts connected to dials designated in FIG. 5 as dials 65A, 66A, 67A, 68A, 70A and 72A and 73A, respectively. In order that molding of thermosetting material can also be carried out, additional reference potentiometers for the injection carriage forward and backward setting positions are provided having dials designated in FIG. 5 as 165A, 166A.

Figure 4:
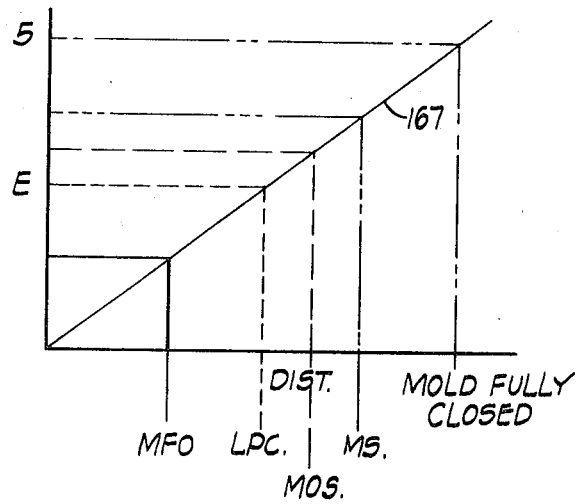
FIG. 4 is a graph illustrating the relationship between the sensing and reference voltages related to movement of one of the movable members of the machine.

The setup is done by manually inching the movable part such as the platen by conventional jogging control and then setting the reference potentiometer for a particular function to correspond to the voltage of the sensing potentiometer at that position by adjustment of the dials shown in FIG. 5 and recording the positions at which the dials have been adjusted in order that the setup can be reproduced at a later time without repeating the process of inching the movable parts to the respective positions. To facilitate the adjustment of the dials, the output circuits of the control circuits 55 to 64, inclusive, as shown in FIG. 2 are provided with indicator lamps 55A, 56A, 57A, 58A, 59A, 60A, 61A, 62A, 63A and 64A, respectively, corresponding to the control circuits 55 to 64. The manner of making the adjustment in connection with the settings depending upon the position of the platen and the movable part of the mold is illustrated in the graph of FIG. 4. All the potentiometers are so constructed so as to produce a voltage varying with a high degree of linearity with the movement of the part by which they are controlled. In FIG. 4 the vertical distance of coordinates represents voltage at the sliding contact of the sensing potentiometer. The horizontal distance represents the distance moved by the platen. The line 167 representing the variation of voltage with the position of the platen is a straight line through the origin of the graph. During the initial setup, as the platen is inched from the mold open position toward the mold fully closed position, the voltage rises along a line 167. When it reaches the point at which it is desired that the low pressure close solenoid 103 be energized, the manual jogging of the platen is discontinued, the platen is allowed to rest and the dial 66A is adjusted until the lamp 56A lights. This is the position which is retained for this dial when the setup is repeated. In a similar manner, the platen is jogged to the position in which it is desired that the functions corresponding to the mold safe position be performed. Then the dial 67A is adjusted until the lamp 57A lights, indicating that the sensing voltage is just equal to the reference voltage of the potentiometer 67. The operation is repeated with the platen at the position for the mold fully closed.

On the return stroke the reference potentiometer dial 69A is adjusted until the lamp 59A lights when the platen is in a position designated mold open slow and the reference potentiometer dial 65A is adjusted until the lamp 55A lights when the platen is in a position for the mold fully open.

While the invention has been described as embodied in concrete form and as operating in a specific manner in accordance with the provisions of the patent statutes, it should be understood that the invention is not limited thereto, since various modifications will suggest themselves to those skilled in the art without departing from the spirit of the invention.

What is claimed is:

1. In injection molding apparatus having a plurality of movable members having a back and forth movement and including a platen, an injection screw and eject mechanism and operators for said movable members, a control therefore, comprising in combination:
    a sensing potentiometer for each of said movable members including:
        terminals for supplying a fixed voltage,
        a resistor connected across said terminals, and
        a sliding contact on the resistor connected to the movable member for varying voltage at the contact with movement of the member,
    a reference potentiometer for each of a plurality of functions including:
        terminals for supplying a fixed voltage, a resistor connected across said terminals, and a sliding contact on the reference potentiometer resistor for setting a reference point for control of the member with which the reference potentiometer is associated, a plurality of circuits, each associated with one of said movable members, each circuit including:

a voltage comparator with a pair of input terminals, one connected to a sensing potentiometer sliding contact and the other connected to a reference potentiometer sliding contact, a bistable circuit having a one state and a zero state, responsive to the voltage comparator producing the one state when the sensing voltage equals or exceeds the reference voltage and the zero state when the reference voltage exceeds the sensing voltage, and connections for actuation of one of the movable member operators when the circuit is in the one state, the sliding contact of one of the sensing potentiometers being connected to the platen, the sliding contact of another sensing potentiometer being connected to the injection screw and the sliding contact for a third sensing potentiometer being connected to the eject mechanism and a plurality of the voltage comparators being associated with the platen and having one input terminal connected to the sliding contact of the platen sensing potentiometer, each comparator having the other input terminal connected to the sliding contact of a different reference potentiometer associated with the platen with the connections from the bistable circuits for the different reference potentiometers associated with the platen being connected to operators which are to be actuated at different positions of the platen, each voltage comparator comprising a transistor, the input terminals thereof comprising a base and emitter, each bistable circuit comprising a pair of transistors, each with a collector, a base and an emitter, the bases and collectors being cross-coupled, and the base of one of the bistable transistors being coupled to the collector of the comparator transistor, and the actuating connections from the bistable circuits being taken from one of the collectors thereof, first, second and third inhibit-OR gates being provided, one of the comparators being associated with the screw and having one input terminal connected to the sliding contact of the sensing potentiometer and the other connected to the sliding contact of the reference potentiometer associated with the screw, the comparator output terminal of the last-mentioned comparator being connected to an operator for opening the mold, the bistable circuits including a low-pressure closed bistable circuit, an injection start bistable circuit and a mold-safe bistable circuit, an operator being provided for applying low pressure to the platen in the mold-closing position for moving the mold at low speed as it approaches the close position, an operator being provided for applying higher pressure to the platen after the mold has reached the mold-safe position, the first OR-inhibit gate having an OR input from the low-pressure close bistable circuit and two inhibit inputs, one from the mold-safe bistable circuit and the other from the output of the third OR inhibit gate and having an output terminal to the low-pressure operator, the second OR-inhibit gate having an inhibit input terminal from the output of the first inhibit gate and an output to the higher pressure operator and the third OR-inhibit gate having first and second OR inputs and an inhibit input, an OR input of the third inhibit gate being connected to the output thereof, the second OR input of the third inhibit gate being connected to the zero output terminal of the injection start bistable circuit, the second OR-inhibit gate having an inhibit input from the output of the first inhibit gate and an output to the high-pressure operator.

2. The combination described in claim 1 in which two reference potentiometers and two comparator circuits are associated with the ejector, the sliding contact of one ejector reference potentiometer being adapted to be set at a point corresponding to the sensing potentiometer voltage for a position of the ejector for the back position of the ejector, and the sliding contact of the other reference potentiometer associated with the ejector being adapted to be set at a voltage point corresponding to the sensing potentiometer voltage in the forward position of the ejector, one of the output terminals of the ejector back comparator being connected to an operator for closing the mold, one of the output terminals of the ejector forward comparator circuit being connected to an operator for retracting the ejector.

3. The combination described in claim 2 in which each of the comparator circuits has an indicator lamp connected to an output terminal for enabling the reference circuit potentiometers to be adjusted by inching the molding mechanism to the position of a moving part in which actuation of another mechanism or operator is desired and manually moving the reference potentiometer sliding contact to the point at which the indicator lamp lights.

* * * * *